United States Patent
Kang et al.

(10) Patent No.: US 9,512,265 B2
(45) Date of Patent: Dec. 6, 2016

(54) FOAM SHEET USING CROSS-LINKED POLYLACTIC ACID, AND PREPARATION METHOD THEREOF

(71) Applicant: LG Hausys, Ltd., Seoul (KR)

(72) Inventors: Chang Won Kang, Cheongju-si (KR); Cheng Zhe Huang, Cheongju-si (KR); Ji Hyang Son, Daejeon (KR)

(73) Assignee: LG HAUSYS, LTD., Seoul (KR)

( * ) Notice: Subject to any disclaimer, the term of this patent is extended or adjusted under 35 U.S.C. 154(b) by 0 days.

(21) Appl. No.: 14/360,149

(22) PCT Filed: Dec. 6, 2012

(86) PCT No.: PCT/KR2012/010514
§ 371 (c)(1),
(2) Date: May 22, 2014

(87) PCT Pub. No.: WO2013/089387
PCT Pub. Date: Jun. 20, 2013

(65) Prior Publication Data
US 2014/0295169 A1    Oct. 2, 2014

(30) Foreign Application Priority Data

Dec. 13, 2011    (KR) .................. 10-2011-0133976

(51) Int. Cl.
*C08G 63/08* (2006.01)
*C08J 9/00* (2006.01)
(Continued)

(52) U.S. Cl.
CPC ............ *C08G 63/08* (2013.01); *B29C 47/0042* (2013.01); *B32B 5/18* (2013.01); *B32B 5/20* (2013.01);
(Continued)

(58) Field of Classification Search
CPC .............. B32B 5/18; B32B 5/20; B32B 27/36; C08J 9/0028; C08J 9/0033; C08J 2205/052; Y10T 428/249976
See application file for complete search history.

(56) References Cited

U.S. PATENT DOCUMENTS 6,310,171 B1    10/2001    Naito et al.
2005/0123744 A1    6/2005    Mohanty et al.
(Continued)

FOREIGN PATENT DOCUMENTS

CN    1923891 A    3/2007
CN    101151310 A    3/2008
(Continued)

OTHER PUBLICATIONS

Translation of JP 2008-094871, H. Kaneiwa, Apr. 24, 2008, p. 1-5.*
(Continued)

*Primary Examiner* — Hai Vo
(74) *Attorney, Agent, or Firm* — Hauptman Ham, LLP

(57) ABSTRACT

The present invention relates to a foam sheet using cross-linked polylactic acid and method of manufacturing the same, and more particularly a foam sheet using cross-linked polylactic acid and method of manufacturing the same with not only excellent waterproofing and workability but also relatively high foaming ratio and a uniform closed foam cell structure, by producing cross-linked polylactic acid resin in a fixed condition using composites comprising polylactic acid, cross linking agents, and/or co-crosslinking agents, and then forming a sheet shape in a fixed condition using composites comprising the cross-linked polylactic acid and foaming agents, and then foaming at relatively high temperature conditions.

10 Claims, 1 Drawing Sheet

(51) Int. Cl.
   *B32B 5/18*   (2006.01)
   *C08J 9/10*   (2006.01)
   *B29C 47/00*  (2006.01)
   *B32B 5/20*   (2006.01)
   *B32B 27/36*  (2006.01)
   *B32B 5/32*   (2006.01)

(52) U.S. Cl.
   CPC ............... *B32B 5/32* (2013.01); *B32B 27/36* (2013.01); *C08J 9/0028* (2013.01); *C08J 9/0033* (2013.01); *C08J 9/10* (2013.01); *B32B 2250/05* (2013.01); *B32B 2266/0264* (2013.01); *B32B 2266/08* (2013.01); *B32B 2307/73* (2013.01); *C08J 2201/026* (2013.01); *C08J 2205/052* (2013.01); *C08J 2300/16* (2013.01); *C08J 2367/04* (2013.01); *Y10T 428/249976* (2015.04)

(56) References Cited

U.S. PATENT DOCUMENTS

| | | | |
|---|---|---|---|
| 2007/0141286 A1 | 6/2007 | Takase et al. | |
| 2008/0114091 A1* | 5/2008 | Malwitz | C08J 3/28 522/162 |
| 2009/0270524 A1 | 10/2009 | Oka et al. | |
| 2011/0008609 A1* | 1/2011 | Nakamura | C08J 9/08 428/319.3 |
| 2011/0016780 A1* | 1/2011 | Furukawa | A01G 5/04 47/41.01 |

FOREIGN PATENT DOCUMENTS

| | | |
|---|---|---|
| EP | 1944333 A1 | 7/2008 |
| EP | 1975195 A1 | 10/2008 |
| JP | 2003128901 A | 5/2003 |
| JP | 2004051803 A | 2/2004 |
| JP | 2004-181821 A | 7/2004 |
| JP | 2007-069965 A | 3/2007 |
| JP | 2007186692 A | 7/2007 |
| JP | 2008094871 A * | 4/2008 |
| JP | 2010-111740 A | 5/2010 |
| JP | 2011-213820 A | 10/2011 |
| KR | 100535258 B1 | 12/2005 |
| KR | 20080067424 A | 7/2008 |
| KR | 100900251 B1 | 5/2009 |
| KR | 20090086814 A | 8/2009 |
| RU | 2291167 C2 | 1/2007 |
| WO | 2006/103969 A1 | 10/2006 |
| WO | 2007/052543 A1 | 5/2007 |
| WO | 2008/078413 A1 | 7/2008 |
| WO | 2011115382 A2 | 9/2011 |

OTHER PUBLICATIONS

International Search Report for PCT/KR2012/010514 mailed on Mar. 26, 2013.
Chinese Office Action dated Mar. 2, 2015.
European extended search report dated May 4, 2015.
Japanese Office Action dated Feb. 10, 2015.
Chinese Office Action dated Oct. 20, 2015 in connection with the counterpart Chinese Patent Application No. 201280058923.1.
Russian Notice of Allowance dated on Jun. 21, 2016 for counter Russian application No. 2014121680/05(035043) citing the above reference(s).
Japanese Notice of Allowance dated Sep. 13, 2016 in connection with the counterpart Japanese Patent Application No. 2014-547091, citing the above reference(s).

* cited by examiner

FOAM SHEET USING CROSS-LINKED POLYLACTIC ACID, AND PREPARATION METHOD THEREOF

CROSS REFERENCE TO RELATED APPLICATION

This application claims the priority of Korean Patent Application No. 10-2011-0133976 filed on Dec. 13, 2011 in the Korean Patent and Trademark Office. Further, this application is the National Phase application of International Application No. PCT/KR2012/010514 filed on Dec. 6, 2012, which is incorporated herein by reference in its entirety.

TECHNICAL FIELD

The present invention relates to a foam sheet using cross-linked polylactic acid and method of manufacturing the same, and more particularly a foam sheet using cross-linked polylactic acid and method of manufacturing the same with not only excellent waterproofing and workability but also relatively high foaming ratio and a uniform closed foam cell structure, by producing cross-linked polylactic acid resin in a fixed condition using composites comprising polylactic acid, cross linking agents and/or co-crosslinking agents, and then forming a sheet shape in a fixed condition using composites comprising the cross-linked polylactic acid resins and foaming agents, and then foaming at relatively high temperature conditions.

BACKGROUND ART

Foam sheets using petroleum resin such as polyvinyl chloride (PVC), etc. are widely used in buildings such as houses, mansions, apartments, offices stores, etc.

The foam sheet is manufactured by extrusion or calendaring methods, etc. using resins such as polyvinyl chloride (PVC), etc. But, since entire quantities are obtained from raw materials, which are limited resources such as oil, etc., problems of difficulties of meeting supply and demand, etc. occurring in the future with regards to exhaustion of oil resources, etc. is expected.

Also, even considering the current rising attention to environmental problems, polyvinyl chloride (PVC) foam sheets have problems of easily emitting toxic substances and imposing burden on the environment even when disposed.

In respect to these problems, polylactic acid extracted from plant resources and synthesized is receiving attention to substitute the petroleum resin. Polylactic acid is a resin produced by polymerizing lactic acid, which is obtained from fermenting starch extracted from renewable plant resources (corn, potato, sweet potato, etc.), and is an environmental-friendly resin not only able to reduce $CO_2$ but also able to reduce non-regenerative energy. Korean Patent Laid-open Publication No. 10-2008-0067424 and numerous prior publications mention foam sheets using this polylactic acid.

But, this polylactic acid is easily hydrolyzed in fixed humidity and temperature conditions, and compared to foam sheets produced from prior PVC resin, foam sheets produced from polylactic acid sticks to processing equipments when processing thermal lamination, or lacks viscoelasticity when processing in high temperatures, and thus have disadvantages of process of lamination to multiple layers being not easy. Therefore, improving waterproofing and workability has been a very important task.

Also, polylactic acid is a resin having strong crystallizability and relatively low molecular weight, and since melt strength is low, not only is foaming ratio low during foaming but also there are problems of ununiform open foam cell forming, and thus producing foam sheets with a uniform and closed foam cell structure was required.

DISCLOSURE

Technical Problem

An purpose of the present invention is to provide a foam sheet using cross-linked polylactic acid and method of manufacturing the same, and more particularly to provide a foam sheet using cross-linked polylactic acid and method of manufacturing the same with not only excellent waterproofing and workability but also relatively high foaming ratio, and a uniform closed foam cell structure by producing cross-linked polylactic acid resin in a fixed condition using composites comprising polylactic acid, cross linking agents and/or co-crosslinking agents, and then forming a sheet shape in a fixed condition using composites comprising the cross-linked polylactic acid and foaming agents, and then foaming at relatively high temperature conditions

Technical Solution

A foam sheet in accordance with an embodiment of the present invention to achieve the described objective comprises one or more resin layers comprising polylactic acid, and polylactic acid comprised in the resin layer is cross-linked, and foaming cell is a closed structure.

A method for manufacturing a foam sheet in accordance with another embodiment of the present invention to achieve the described objective, comprises one or more resin layers comprising polylactic acid, and comprises: cross linking by raising temperatures of first composite comprising 100 parts by weight of polylactic acid, 0.001~10 parts by weight of cross linking agents; producing a sheet by extruding or calendering a second composite obtained by further adding 0.1~10 parts by weight of foaming agents per 100 parts by weight of polylactic acid to the cross-linked first composite; and foaming by passing the sheet through an oven.

Advantageous Effects

A foam sheet using polylactic acid according to the present invention, as biodegradable resin comprising polylactic acid is reformed through a cross linking reaction, cross linking between molecular chains are achieved and thus melt strength is increased and thus thermal processing is easily performed, and not only does the physical properties such as waterproofing, tensile strength, elongation, etc. improve but also physical properties of foaming greatly improves and thus being able to form a closed structured cell.

A foam sheet using polylactic acid according to the present invention uses polylactic acid based on plant resources instead of PVC based on oil resources, which is generally used for binders, and thus problems of meeting supply and demand in respect to exhaustion of oil resources may be resolved.

Also, a foam sheet using polylactic acid according to the present invention have advantages of having low emission of environmental toxic substances such as $CO_2$ during production, and is economically friendly in that disposal is simple.

BEST MODE

Figure 1:
FIG. 1 is a cross sectional picture of a foam sheet manufactured according to an embodiment of the present invention.

Advantages and features of the present invention, and method for achieving thereof will be apparent with reference to the accompanying figures and detailed description that follows. But, it should be understood that the present invention is not limited to the following embodiments and may be embodied in different ways, and that the embodiments are given to provide complete disclosure of the invention and to provide thorough understanding of the invention to those skilled in the art, and the scope of the invention is limited only by the accompanying claims and equivalents thereof. Like components will be denoted by like reference numerals throughout the specification Hereinafter, a composite for forming a foam sheet using polylactic acid according to the present invention, a foam sheet formed using the same, and a manufacturing method of the same will be described in detail.

Foam Sheet

A foam sheet in accordance with an embodiment of the present invention comprises one or more resin layers comprising polylactic acid, polylactic acid comprised in the resin layer is cross-linked, and foaming cell is a closed structure.

A foam sheet in accordance with the present invention not only has excellent waterproofing and workability, but also has relatively high foaming ratio and a uniform closed cell structure.

First, a foam sheet in accordance with the present invention comprises polylactic acid. The polylactic acid is a thermoplastic polyester obtained by polymerization of lactide or lactic acid, for a manufacturing example, it may be manufactured by polymerization of lactide or lactic acid produced by fermenting starch extracted from corn, potato, etc. Since the corn, potato, etc. are plant resources that may be regenerated any number of times, polylactic acid, which is obtained from these, may effectively deal with the problem of oil resource depletion.

Also, polylactic acid resin has lower emission of environmental toxic substances such as $CO_2$, etc. during usage and disposal processes compared to oil based materials such as polyvinyl chloride (PVC), and is economically friendly in that it decomposes easily in natural environments even when disposed.

The polylactic acid resin may be divided in to crystalline polylactic acid (c-polylactic acid) resin and non-crystalline polylactic acid (a-polylactic acid) resin. In this instance, since bleeding situations, in which plasticizer flows out to the surface of a foam sheet, may occur in the case of crystalline polylactic acid resin, using non-crystalline polylactic acid resin is preferable. In the case of non-crystalline polylactic acid resin, it is advantageous in that it does not require adding compatibilising agents, which is essentially added to prevent bleeding situations. In the case where non-crystalline polylactic acid resin is used, it is most preferable to use 100% non-crystalline polylactic acid resin for polylactic acid resin, and polylactic acid resin with crystalline and non-crystalline co-existing may be used when necessary.

Here, using one or more elements selected from L-polylactic acid, and D-polylactic acid for the polylactic acid resin is preferable for workability and plasticizer bleeding prevention.

The resin layer of the present invention is formed by, apart from polylactic acid resin, biodegradable resin composites comprising cross linking agents and foaming agents.

Here, the cross linking agents are used in cross linking reaction of polylactic acid. Organic peroxide is preferable for the cross linking agents, and specifically dicumyl peroxide (DCP), perbutyl peroxide (PBP), dimethyldi-t-butylperoxyhexane, t-butylethylmonohexylperoxycarbonate, etc. may be cited, but is not limited to this.

It is preferable for the cross linking agent to be comprised 0.001~10 parts by weight per 100 parts by weight of polylactic acid in the composite. When the content of cross linking agent is less than the range, there are problems of cross linking reaction not starting, and when it is more than the range, cross linking is too high and show thermosetting properties and thus there are problems during processing.

Meanwhile, the foaming agent is used to form a closed cell of a foam sheet in accordance with the present invention. It is preferable for the foaming agent to be one or more elements selected from azodicarbonamide, p,p'-oxybisbenzenesulfonylhydrazide, p-toluenesulfonylhydrazide, and benzenesulfonylhydarazide, but it not limited to this.

It is preferable for the foaming agent to be comprised 0.1~10 parts by weight per 100 parts by weight of polylactic acid in the composite. When the content of foaming agent is less than the range, there are problems of effect of foaming being minimal, and when it is more than the range, foaming is excessive and open cells are excessively produced and thus there are problems of strength reducing.

According to the present invention, the biodegradable resin composite may further comprise one or more elements selected from co-crosslinking agent, co-foaming agent, plasticizer, and inorganic filler.

First, the co-crosslinking agent plays the role of helping cross linking reaction of the present invention to occur smoothly. It is preferable for the co-crosslinking agent to be triallyl isocyanurate(TAIC), but is not limited to this.

Here, it is preferable for the co-crosslinking agent to be comprised 1.0 or less parts by weight per 100 parts by weight of polylactic acid in the composite. When the content is more than 1.0 parts by weight, excessive cross linking is formed and there are problems of transitioning to thermosetting resin or resin that is difficult to process. Also, the co-foaming agent plays the role of helping foaming reaction of the present invention to occur smoothly. It is preferable for the co-foaming agent to be one or more of elements selected from zincneodecarbonate, potassiumneodecarbonate, and zinc 2-ethylhexanoate, but is not limited to this.

Here, it is preferable for the co-foaming agent to be comprised 10.0 or less parts by weight per 100 parts by weight of polylactic acid in the composite. When the content is more than 10.0 parts by weight, excessive foaming occurs and there are problems of not only early foaming occurring during sheet thermoforming but also open cell foaming form may appear.

Also, the plasticizer plays the role of improving the workability of a foam sheet of the present invention. It is preferable for the plasticizer to be one or more elements selected from citric acid and citric acid ester, but is not limited to this.

Here, it is preferable for the plasticizer to be comprised 100 or less parts by weight per 100 parts by weight of polylactic acid. When the content is more than 100 parts by weight, there are problems of difficulty of processing.

Also, the inorganic filler has excellent compatibility with resin, and specifically calcium carbonate, talc, wood fiber, etc. may be used, but is not limited to this.

It is preferable for the inorganic filler to be comprised 300 or less parts by weight per 100 parts by weight of polylactic acid. When the content is more than 300 parts by weight, content of resin is excessively low and there are problems of difficulty of processing and strength reduction.

Polylactic acid is cross linked to a foam sheet of the present invention describe above by cross linking agents, and there are effects of waterproofing and excellent workability. Hereinafter, a method for manufacturing a foam sheet in accordance with the present invention is described.

Manufacturing Method of Foam Sheet

A method for manufacturing a foam sheet in accordance with another embodiment of the present invention to achieve the described objective, comprises one or more resin layers comprising polylactic acid, and comprises: cross linking by raising temperatures of first composite comprising 100 parts by weight of polylactic acid, 0.001~10 parts by weight of cross linking agent; producing a sheet by extruding or calendering a second composite obtained by further adding 0.1~40 parts by weight of foaming agent per 100 parts by weight of polylactic acid to the cross-linked first composite; and foaming by passing the sheet through an oven.

First, a first composite comprising polylactic acid resin of the present invention is cross linked by heating.

The required temperature in this process is a higher temperature than a temperature during the thermal forming, and about 100~250° C. is preferable. In this instance, cross linking agent comprised in the first composite is radical decomposed, and cross linking between polylactic acid resins initiates. At this time, an extruder and kneader may be used.

Next, a sheet is produced by extrusion or calendaring the second composite obtained by further adding foaming agents, etc. to the cross-linked first composite. At this time, ingredients are mixed or kneaded, and the mixing and kneading process, for example, may be performed by using liquid or powder ingredients in a super mixer, extruder, kneader, double or triple roll, etc.

Also, in the ingredient mixing and kneading process, for a more efficient mixing, the mixing and kneading process may be performed in multiple steps and repeatedly such as methods of kneading mixed ingredients using a banbury mixer, etc. at a temperature of about 120~200° C., and first and second mixing the kneaded ingredients using a double roll, etc. at a temperature of about 120~200° C. In this instance, since the descriptions for each ingredient is as above, it is skipped here.

Next, sheet is passed through an oven and foamed. In this instance, since condition for foaming is 100~250° C., foaming does not occur when below the described temperature, and when above the described temperature, volatization of plasticizer is severe and there are problems of flexibility sharply declining.

Foaming method is a common method to those skilled in the art and is not specifically limited.

According to a method for manufacturing foam sheet of the present invention as above, operation is very easy since workability is excellent, and products by it has excellent waterproofing.

Manufacturing Foam Sheet According to an Example and Comparative Example

Hereinafter, manufacturing example according to a manufacturing example and a comparative example of a foam sheet according to a preferred embodiment of the present invention is provided. But, it should be understood that the examples are presented as a preferred embodiment of the present invention, and the present invention is not limited to the following example.

Contents not written here may be fully inferred by those skilled in the art, and thus the description is skipped.

Example 0.3 parts by weight of t-butyl-2-ethylmonohexylperoxycarbonate, which is a cross linking agent, and 0.1 parts by weight of triallyl isocyanurate, which is a cross linking agent, is mixed with 100 parts by weight of non-crystalline polylactic acid (Natureworks) with a super mixer, and then cross linking reaction is performed using a 2 axis extruder at 160 degrees, and cross-linked resin in a pallet shape was manufactured. A composite for foaming was manufactured by skillfully kneading 100 parts by weight of the manufactured cross-linked resin with 100 parts by weight of inorganic filler(calcium carbonate: $CaCO_3$) 40 parts by weight of plasticizer (citric acid), parts by weight of foaming agent (azodicarbonate 80%/4,4'-oxydibenzenesulfonyl hydrazide 20%), 2 parts by weight of co-foaming agent (zinc neo decarbonate) with a banbary mixer at 130 degrees. A foam sheet was completed by manufacturing a sheet with a thickness of 120 μm from the manufactured composite using a double roll set at 100 degrees, and then put in a foaming oven for 40 seconds at 190 degrees.

Comparative Example

Except for not adding a cross linking agent, a foam sheet was manufactured in an identical condition as the example.

Evaluation

The evaluation result for physical properties (tensile strength, immersion contraction percentage) and foaming ratio of the example and comparative example is shown in Table 1.

TABLE 1

|  | Example | Comparative example |
| --- | --- | --- |
| Tensile strength (kg/1.5 cm) | 11.6 | 5.9 |
| Immersion contraction percentage (%) | 0.19 | 0.79 |
| Foaming ratio (%) | 250 | 140 |

As in the evaluation results, a foam sheet in accordance with the present invention cross links polylactic acid and is foamed in relatively high temperatures, and thus a polylactic acid foam sheet not only having excellent waterproofing and workability, but also having relatively high foaming ratio, and a uniform closed foam cell structure may be manufactured was observed.

Figure 2:
FIG. 2 is a cross sectional picture of a foam sheet manufactured according to a comparative example of the present invention.

Also, results from observing the cross section of the foam sheet manufactured by the example and the comparative example are illustrated in FIGS. 1 and 2.

As can be observed in FIG. 1, in the case of a foam sheet manufactured according to an example of the present invention, a closed structure of a foaming cell was able to be formed, but in FIG. 2, in the case where manufactured according to the comparative example, a closed structure of a foaming cell did not form.

Although some exemplary embodiments have been described herein, it should be understood by those skilled in the art that these embodiments are given by way of illustration only, and that various modifications, variations and alterations can be made without departing from the spirit and scope of the invention. The scope of the present invention should be defined by the appended claims and equivalents thereof.

The invention claimed is:

1. A foam sheet, comprising: one or more resin layers comprising a non-crystalline polylactic acid; and forming cells,
wherein the non-crystalline polylactic acid is cross-linked, and each of the foaming cells has a closed structure,
wherein each of the one or more resin layers is formed from a biodegradable resin composite comprising 0.001~10 parts by weight of a cross linking agent, 0.1~10 parts by weight of a foaming agent, per 100 parts by weight of the non-crystalline polylactic acid,
wherein the cross linking agent is one or more of organic peroxides selected from perbutyl peroxide, and t-butylethylhexylmonoperoxy carbonate,
wherein the biodegradable resin composite further comprises a plasticizer, a co-foaming agent and a co-crosslinking agent,
wherein the content of the plasticizer is 40~100 parts by weight per 100 parts by weight of the non-crystalline polylactic acid,
wherein the co-foaming agent comprises one or more elements selected from zincneodecarbonate, potassiumneodecarbonate, and zinc 2-ethylhexanoate,
wherein the content of the co-foaming agent is 10.0 or less parts by weight per 100 parts by weight of the non-crystalline polylactic acid,
wherein the content of the co-crosslinking agent is 1.0 or less parts by weight per 100 parts by weight of the non-crystalline polylactic acid, and
wherein the co-crosslinking agent comprises triallyl isocyanurate(TAIC).

2. The foam sheet according to claim 1, wherein the non-crystalline polylactic acid comprises one or more polymers selected from L-polylactide, D-polylactide, and L,D-polylactide.

3. The foam sheet according to claim 1, wherein the biodegradable resin composite further comprises an inorganic filler.

4. The A foam sheet according to claim 3, wherein the content of the inorganic filler is 300 or less parts by weight per 100 parts by weight of the non-crystalline polylactic acid.

5. A method for manufacturing a foam sheet comprising: one or more resin layers comprising a non-crystalline polylactic acid; and forming cells,
wherein the non-crystalline polylactic acid is cross-linked, and each of the foaming cells has a closed structure,
wherein each of the one or more resin layers is formed from a biodegradable resin composite comprising 0.001~10 parts by weight of a cross linking agent, 0.1~10 parts by weight of a foaming agent, per 100 parts by weight of the non-crystalline polylactic acid,
wherein the cross linking agent is one or more of organic peroxides selected from perbutyl peroxide, and t-butylethylhexylmonoperoxy carbonate,
wherein the biodegradable resin composite further comprises a plasticizer, a co-foaming agent and a co-crosslinking agent,
wherein the content of the plasticizer is 40~100 parts by weight per 100 parts by weight of the non-crystalline polylactic acid,
wherein the co-foaming agent comprises one or more elements selected from zincneodecarbonate, potassiumneodecarbonate, and zinc 2-ethylhexanoate,
wherein the content of the co-foaming agent is 10.0 or less parts by weight per 100 parts by weight of the non-crystalline polylactic acid,
wherein the content of the co-crosslinking agent is 1.0 or less parts by weight per 100 parts by weight of the non-crystalline polylactic acid, and
wherein the co-crosslinking agent comprises triallyl isocyanurate(TAIC), the method comprising:
cross linking by raising temperature of a first composite comprising 100 parts by weight of the non-crystalline polylactic acid, 0.001~10 parts by weight of the cross linking agent and 1.0 or less parts by weight of the co-crosslinking agent;
producing a sheet by extruding or calendering a second composite obtained by further adding 0.1~10 parts by weight of the foaming agent, 10.0 or less parts by weight of the co-foaming agent, and 40~100 parts by weight of the plasticizer, per 100 parts by weight of the non-crystalline polylactic acid to the cross-linked first composite; and
foaming by passing the sheet through an oven.

6. The method for manufacturing foam sheet according claim 5, wherein the non-crystalline polylactic acid comprises one or more polymers selected from L-polylactide, D-polylactide, and L,D-polylactide.

7. The method for manufacturing a foam sheet according claim 5, wherein the cross linking agent further comprises one or more organic peroxides selected from dicumyl peroxide, dimethyl di-t-butylperoxy hexane, and 1,1,-di(t-butylperoxy)-3,3,5-trimethylcyclohexane.

8. The method for manufacturing a foam sheet according claim 5, wherein the foaming agent is one or more elements selected from azodicarbonamide, p,p'-oxybisbenzenesulfonylhydrazide, p-toluenesulfonylhydrazide, and benzenesulfonylhydarazide.

9. The method for manufacturing a foam sheet according claim 5, wherein the second composite further comprises an inorganic filler.

10. The method for manufacturing a foam sheet according claim 9, wherein the content of the inorganic filler is 300 or less parts by weight per 100 parts by weight of the non-crystalline polylactic acid.

* * * * *